United States Patent Office 3,170,931
Patented Feb. 23, 1965

3,170,931
FIBER-REACTIVE PHTHALOCYANINE
DYESTUFFS
Charles W. C. Stein, Westfield, N.J., assignor to General
Aniline & Film Corporation, New York, N.Y., a corporation of Delaware
No Drawing. Filed Dec. 18, 1962, Ser. No. 245,411
8 Claims. (Cl. 260—314.5)

This invention relates to novel dyestuffs and more particularly to a novel group of water soluble fiber-reactive dyestuffs of the phthalocyanine series.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine, and the vinyl sulfone or sulfatoethylsulfone types. Because of the relative scarcity of such dyestuffs and/or their substantial unavailability to large sections of the dyeing trade and/or various disadvantages inherent in their production or use with respect to procedure, cost, and/or results obtained, there exists a definite need in the industry for new and improved types of reactive dyestuffs and/or methods of making the same.

In the co-pending application of Randall et al. Serial No. 242,897 filed on December 7, 1962, there is disclosed and claimed fiber-reactive phthalocyanine dyestuffs which are esters of N-β-hydroxy lower alkyl-aminomethyl-containing phthalocyanines. These fiber-reactive dyestuffs thus contain at least one esterified hydroxyethyl-aminomethyl group which has been found to be highly effective as a fiber-reactive group when the dyestuff is applied to the fiber in the presence of an acid binding agent. Such fiber-reactive dyestuffs are also water soluble, yield prints and dyeings of improved fastness properties, and can be represented by the formula (I)     Pcy(—CH$_2$—NR$^1$—CH$_2$CH$_2$—X)$_n$ wherein Pcy represents a member of the group consisting of metal and metal-free phthalocyanine, R$^1$ is a member of the group consisting of H, lower alkyl, hydroxyethyl, and —CH$_2$CH$_2$—X, X is the anion of a strong acid having a dissociation constant greater than $2.0 \times 10^{-5}$, and $n$ has an average value of 1 to 4.

One of the principal difficulties in the preparation of reactive dyestuffs is the attainment of adequate solubility both to facilitate application of the dyestuff to the fiber with which it is to be reacted and to aid in the removal of any dyestuff which has not reacted with the fiber by washing. While the dyestuffs referred to in the preceding paragraph have excellent solubility characteristics by reason of the ester groups therein, under the conditions suitable for carrying out the desired reaction between the dyestuff and the fiber, subsequent decomposition and hydrolysis of the fiber-reactive ester groups take place. Those dyestuff molecules which have not reacted with the fiber are accordingly no longer water soluble by reason of the removal of the ester groups therefrom and are therefore not readily removed from the dyed fiber by washing. On the other hand they are not sufficiently well bonded to the fiber to avoid the serious handicap of poor crockfastness. In addition such loosely held dyestuff contributes greatly to the likelihood of dullness and irregularity of application resulting from possible crystallization on or within the fiber. Sulfonation of the fundamental phthalocyanine molecule in the above dyestuffs, referred to in said co-pending application of the fundamental phthalocyanine molecule in the moval of unreacted dyestuff from the dyed fiber by washing, but usually results in a change of shade and, in some cases, increased dullness.

It is an object of this invention to provide a novel group of water soluble dyestuffs of the phthalocyanine series which will not be subject to one or more of the above disadvantages. Another object of this invention is the provision of a novel group of water soluble fiber-reactive dyestuffs of the phthalocyanine series. Other objects and advantages will appear as the description proceeds.

The attainment of the above objects is made possible by the present invention which comprises compounds of the formula (II)     Pcy$\begin{matrix}(-CH_2NR-CH_2CH_2SO_3H)_m \\ (-CH_2NR^1-CH_2CH_2-X)_n\end{matrix}$ wherein Pcy represents a member of the group consisting of metal and metal-free phthalocyanine, R is a member of the group of H, —CH$_2$CH$_2$OH, lower alkyl, and

—CH$_2$CH$_2$SO$_3$H

R$^1$ is a member of the group consisting of H, lower alkyl, hydroxyethyl, and —CH$_2$CH$_2$—X. X is the anion of a strong acid having a dissociation constant greater than $2.0 \times 10^{-5}$, $m$ has an average value of 1 to 3, and $n$ has an average value of 1 to 4.

The above defined dyestuffs of the invention contain both fiber-reactive groups, namely esterified hydroxyethylaminomethyl groups (—CH$_2$NR$^1$—CH$_2$CH$_2$—X) and water solubilizing sulfoethylaminomethyl groups (—CH$_2$—NR—CH$_2$CH$_2$SO$_3$H)

which are unaffected by application conditions, remain in the dyestuff molecule, and permit removal of unreacted dyestuff from the dyed fiber by washing. The dyestuffs are highly effective as reactive dyes when applied to the fiber in the presence of an acid binding agent, are of improved stability and solubility, and yield colored products having surprisingly good fastness properties, particularly fastness to washing, kier-boiling, chlorine, light, alkaline and acid perspiration, and/or other hydrolytic conditions. The dyestuffs of the invention may be readily prepared by chloromethylation in known manner of a metal or metal-free phthalocyanine, as by reaction with bis-chloromethyl ether or equivalent, to produce an intermediate having the formula (III)     Pcy(—CH$_2$Cl)$_{m+n}$ followed by reaction of this chloromethylated intermediate, in any desired order, with $m$ moles of a taurine compound of the formula (IV)     H—NR—CH$_2$CH$_2$SO$_3$H and with $n$ moles of a primary or secondary amine compound of the formula (V)     H—NR$^1$—CH$_2$CH$_2$—X wherein Pcy, R, R$^1$, X, $m$ and $n$ have the values given above. Instead of reacting the chloromethylated phthalocyanine reactant of Formula III with the amine compound of Formula V, the said reactant is preferably reacted with an amine compound of the formula (VI)     H—NR$^1$—CH$_2$CH$_2$—OH followed by esterification of the resulting intermediate in known manner with at least one molecular equivalent of a strong acid as defined above, or substance yielding same.

In the above formulae Pcy represents an unmetallized phthalocyanine molecule or a metal phthalocyanine molecule of known type. As examples of metal phtahlocyanine molecules there may be mentioned copper, cobalt, aluminum, nickel, iron, zinc, vanadium, tin, magnesium, chromium, and other metal phthalocyanines. Whether metallized or unmetallized, the phthalocyanine molecule may be nuclearly substituted by one or more lower alkyl such as methyl or ethyl, halogen such as chlorine or bromine, sulfonic or phenyl groups. The parenthetical groups in the above formulae are ordinarily bonded to phenylene nucleii in the fundamental phthalocyanine molecule but may be bonded to a phenyl substituent of a phenyl-substituted phthalocyanine molecule.

R and $R^1$ in the above formulae may be hydrogen, or lower alkyl such as methyl, ethyl, and normal and isomeric propyl and butyl. R may also be —$CH_2CH_2SO_3H$, although it is preferably lower alkyl such as methyl. $R^1$ and R may also be hydroxyethyl, but $R^1$ in Formula II is preferably —$CH_2CH_2$—X, as obtained from a reactant of Formula V or VI wherein $R^1$ is —$CH_2CH_2$—X, or preferably hydroxyethyl followed by esterification in situ.

As representative of taurine reactants of Formula IV which may be employed in making the dyestuffs of this invention, there may be mentioned taurine, N-methyl-taurine, N-isobutyltaurine, N-hydroxyethyltaurine, ditaurine of the formula H—N(—$CH_2CH_2SO_3H$)$_2$, and the like. It will be noted that all these taurine reactants have one or two N-bonded reactive hydrogen atoms. The reaction of $m$ moles of the taurine reactant of Formula IV with one mole of the chloromethylated phthalocyanine reactant of Formula III or the intermediate resulting from the reaction of the chloromethylated phthalocyanine of Formula III with an amine compound of Formula V or VI but still containing at least one unreacted chloromethyl group per molecule, is preferably carried out under anhydrous conditions in the presence of an acid binding agent at any temperature ranging from the freezing to the boiling point of the medium. For reasons of economy and because unduly high water solubility of the dyestuff is not particularly desirable, $m$ preferably has an average value of 1 to 2, 1 being optimal.

As the amine reactant of Formula VI, there may be mentioned mono- and di-ethanolamine- and -isopropanolamine, methyl- and isobutyl-ethanolamine and -isopropanolamine, and the like. Less preferably, the corresponding esterified amine reactives of Formula V may be employed. Reaction of $n$ moles of the primary or secondary amine compound of Formula V or VI with one mole of the chloromethylated phthalocyanine reactant of Formula III, or the intermediate resulting from the reaction of said chloromethylated reactant with the taurine reactant of Formula IV but still containing at least one unreacted chloromethyl group, may be carried out if desired in anyhdrous medium, preferably at elevated temperatures of 40° C. to the boiling point of the medium in the presence of known acid binding agents such as alkali metal hydroxides and carbonates or in an excess of the amine reactant. It will be noted that when $R^1$ in the present dyestuffs of Formula II is —$CH_2CH_2$—X, a number of fiber-reactive esterified hydroxyethylaminomethyl groups in the dyestuff is effectively doubled. Whenever these dyestuffs contain two or more such groups, dyeings are obtainable with increased fastness properties due to cross-linking reaction with the fibers.

It will be understood that one or more of the carbon-bonded hydrogens shown in the above formulae may be substituted by lower alkyl of 1 to 4 carbon atoms, the corresponding acetylenically unsaturated alkyls (alkynyl), the correspondnig ethylenically unsaturate alkyls (alkenyl), benzyl, cycloalkyl such as cyclohexyl and cyclopentyl, phenyl, naphthyl, heterocyclic such as furyl, which inert substituents may be further substituted for chain-interrupted by other inert groups or hetero atoms.

In accordance with a preferred embodiment of the invention, X in the formula for the present dyestuffs represents sulfato (—$OSO_3H$) as prepared by reaction of any known sulfating agent with the product of reaction of amine compound VI with chloromethylated compound III or its intermediate from reaction with the taurine compound IV. Preferably, such a sulfating reaction is carried out at a temperature ranging from the freezing point of the medium up to about 110° C., and preferably from about 25 to 110° C., using at least a molecularly equivalent amount of a sulfating agent which is a complex compound of sulfur trioxide with a tertiary organic amine. Such complex compounds are well known and are disclosed for example in U.S. 2,403,226. They may be represented by the formula $R^2R^3R^4N \cdot SO_3$ wherein $R^2R^3R^4N$ is the molecule of the tertiary organic amine. $R^2$, $R^3$, and $R^4$ may be the same or different and may be aromatic or non-aromatic such as lower alkyl of 1 to 4 carbon atoms, the corresponding ethylenically and acetylenically unsaturated hydrocarbons, aralkyl such as benzyl, alicyclic such as cyclohexyl or cyclopentyl, and heterocyclic such as furyl, or may together, in whole or part, represent the atoms necessary to complete a heterocyclic ring with the N atom such as pyridine, morpholine, and piperidine. As examples of such tertiary organic amines, there may be mentioned pyridine, N, N-dimethyl- and -dibutyl-aniline, tri-methyl-, -isobutyl-, cyclohexyl-, and -allyl-amines, methylethylisopropylamine, dimethyl and dibutyl benzyl-amines, cyclohexyl, dimethylamine, cyclopentyl di-butylamine, N,N-dimethyl- and dibutyl-formamides, N-methyl- and butyl-morpholines and-piperidines, and the like. For most purposes, these amines should have a dissociation constant of at least $1 \times 10^{-7}$.

The complex compound of the tertiary organic amine with sulfur trioxide is likewise prepared in known manner, in general requiring the action of sulfur trioxide or an agent yielding sulfur trioxide on the tertiary organic amine. As representative of such an agent, use may be made of chlorosulfonic acid in a ratio of one mole of the chlorosulfonic acid to two moles of the tertiary organic amine, the hydrogen chloride liberated during the reaction forming a salt with the extra mole of tertiary organic amine. The sulfur trioxide or agent yielding same may be added to the tertiary organic amine or vice versa, and the reaction may be carried out in excess tertiary organic amine, in an inert organic solvent or diluent such as chlorobenzene or the like, or in an aqueous alkaline media.

In the sulfating reaction between the phthalocyanine reactant and the tertiary organic amine-sulfur trioxide complex, an amount of the complex at least molecularly equivalent to the said reactant is employed in order to provide the resulting dyestuff with at least one fiber-reactive sulfatoethylimino group. The amount of complex employed will however generally be sufficient to esterify, e.g., sulfate, all the hydroxyethyl radicals in the parenthetical groups in the phthalocyanine reactant, i.e., $n$ molecular equivalents of the tertiary organic amine-sulfur trioxide complex when $R^1$ is not hydroxyethyl, and two $n$ equivalents when $R^1$ is hydroxyethyl.

The sulfating reaction may be carried out in aqueous media, in an inert organic solvent or diluent such as chlorobenzene, lower aliphatic alcohols, acetone or the like, in aqueous media containing the same, or preferably in an excess of the organic tertiary amine, in which case the desired product is produced in the form of the amine salt. The corresponding alkali metal salt may be obtained, and the tertiary organic amine simultaneously liberated and recovered by treating such amine salt with alkali such as sodium or potassium hydroxide. The corresponding acid-sulfate ester may likewise be obtained in known manner by acidification, salting, etc. and it is to be considered equivalent to the salts thereof with ammonia, amines, alkali metals, alkaline earth metals, etc.

The above described method of reacting a tertiary organic amine-sulfurtrioxide complex with a phthalocyanine containing at least one hydroxyethylaminomethyl group is per se not claimed herein, being disclosed and claimed in my co-pending application Serial No. 242,898, filed on December 7, 1962.

Alternatively, X may represent the anion of any other strong acid having a dissociation constant greater than $2.0 \times 10^{-5}$ such as the anions of hydrochloric, hydrobromic, hydrofluoric, iodic, phosphoric, phosphonic, phosphinic, organic sulfonic (sulfonyloxy), trichloroacetic, dichloroacetic, chloroacetic, formic acids and the like. These dyestuffs may likewise be readily produced in known manner by reaction of the phthalocyanine precursor, instead of with a sulfating agent, with the corresponding desired esterifying acid or a functional equivalent thereof under known esterifying conditions and in at least molecularly equivalent amounts, preferably using sufficient esterifying agent to react with all the hydroxyethyl groups in said precursor.

The fiber-reactive phthalocyanine dyestuffs of the present invention are highly effective for coloring natural and synthetic fibers preferably those containing an active H atom in the molecule, particularly cellulosic textile fibers in any desired shades of good to excellent fastness and stability properties. The coloring process involves dyeing (including printing) the fibrous materials by application thereto under acid-binding conditions of an aqueous medium containing a dyestuff of the invention at any temperature ranging from ambient temperatures to the boiling point of the medium, the dyestuff thereby reacting with the fiber with liberation of acid HX. The medium may have a pH ranging from about 4 to 14 although alkaline conditions are preferred. The medium may be applied in any desired manner, by continuous or batch methods and by immersion, roller application, padding, spraying, brushing, printing or the like. The speed of reaction between the fiber and the fiber-reactive dyestuff produced by the present process will generally vary inversely with the temperature. The fiber, for example in the form of a fabric, may for example be continuously padded with the fiber-treating medium, and then, if desired after a gentle squeezing, may be wound on a roller with alternating sheets of polyethylene film, and/or the entire roll wrapped in a polyethylene package, and the package held at room temperature or slightly higher until completion of the desired reaction between the fiber and the reactive dyestuff has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed to, for example, a 50 to 200% liquor pickup, dried and heated at 90 to 350° C. for an hour or more to 30 seconds or less. A dry heat treatment may be substituted by a steaming or the like if desired.

The dyeing medium may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids, and the like, and thickening agents for the production of printing pastes such as methyl cellulose, starch, gum arabic, gum tragacanth, locust bean gum, sodium alginate, synthetic resins, and the like.

The following examples are only illustrative of this invention and are not to be regarded as limitative. All parts and proportions referred to herein and in the appended claims are by weight unless otherwise indicated.

EXAMPLE 1

A. *Bis-chloromethyl-N-methyl-N(sulfo-ethyl)aminomethyl copper phthalocyanine*

Sixty-one parts of tris-chloromethyl copper phthalocyanine (prepared by the reaction of bischloromethyl ether with copper phthalocyanine in the presence of aluminum chloride), 18.8 parts of methyl taurine (N-methyl-aminoethane sulfonic acid, sodium salt), 12.0 parts of sodium carbonate anhydrous and 400 parts of absolute alcohol are heated together at the reflux temperature for 12 hours. The solution is allowed to cool, filtered, and the residue washed with alcohol and dried under vacuum. The product when dried has a chlorine content of about 11%.

B. *Bis-(N,N-di-(hydroxyethyl)aminomethyl)-N'-methyl-N'-(sulfoethyl)-aminomethyl copper phthalocyanine*

Thirty-four parts of the intermediate from A above are mixed with 200 parts of diethanolamine and heated with good agitation to 80° C. The mixture is stirred at 80° C. for seven hours. It is then cooled to room temperature and poured into 600 parts of isopropyl alcohol. After stirring well the mixture is filtered and washed with a small amount of isopropyl alcohol.

After drying under vacuum, the product is obtained as a dark blue powder. The chlorine content is less than 1%.

C. *Sulfation*

Forty-five parts of chlorosulfonic acid are added slowly to 200 parts of pyridine. After all the acid is added, 40 parts of the intermediate from B above are added to the solution of the pyridine-sulfur trioxide complex, allowing the temperature to rise to 40° C. The temperature is held at 40° C. for one hour, then the reaction mixture is cooled and poured into 600 parts of cold water. The solution is adjusted to a pH of 6.0 with 50% sodium hydroxide solution and the pyridine and water mixture distilled off under vacuum at temperatures below 60° C. After all the pyridine is removed the aqueous solution is evaporated on the steam bath and dried under vacuum. A light blue powder is obtained which is readily soluble in water with a deep blue color. It is the sodium salt of the dyestuff of the formula:

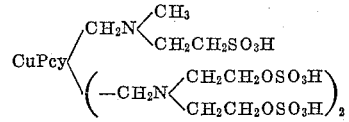

In the above procedure, use of a tris-chloromethyl tetrachloro copper phthalocyanine as starting material in A results in a dyestuff with a greener turquoise blue shade. Use of the corresponding cobalt, nickel or iron, instead of copper, phthalocyanine, produces similar results.

EXAMPLE 2

A. *Chloromethyl-N-methyl-N(sulfoethyl)aminomethyl copper phthalocyanine*

Thirty parts of bis-chloromethyl copper phthalocyanine, 8 parts of methyl taurine, 6 parts of sodium carbonate anhydrous and 200 parts of absolute alcohol are heated together at reflux for 12 hours.

The solution is worked up as in Example 1A to give a product which, when dry, has a chlorine content of about 5%.

B. *N,N-di-(hydroxyethyl)aminomethyl-N'-methyl-N'-(sulfoethyl)aminomethyl copper phthalocyanine*

Twelve parts of the intermediate from A above are mixed with 90 parts of diethanolamine and heated with good stirring to 80° C. The mixture is stirred at 80° C. for seven hours. It is then cooled and worked up as in Example 1B.

After vacuum drying a dark blue powder is obtained which is soluble in water with a blue color. The chlorine content is less than 1%.

C. *Sulfation*

Thirty-one parts of sulfur trioxide are added slowly to 200 parts of pyridine. After all the sulfur trioxide is added, 40 parts of the intermediate from B above are added to the pyridine-sulfur trioxide complex. The solution is then heated to 60° C. and held for one hour at that temperature. The mixture is cooled, poured into 600 parts of cold water and worked up as in Example 1C. A blue powder is obtained with a redder shade, and less water soluble, than the product of Example 1. It is the sodium salt of the formula:

$$CuPcy\begin{cases} -CH_2N\begin{cases} CH_3 \\ CH_2CH_2SO_3H \end{cases} \\ -CH_2N\begin{cases} CH_2CH_2OSO_3H \\ CH_2CH_2OSO_3H \end{cases} \end{cases}$$

EXAMPLE 3

A. *Bis-chloromethyl-N-(sulfoethyl)aminomethyl copper phthalocyanine*

Sixty parts of tris-chloromethyl copper phthalocyanine, 20 parts of taurine (sodium aminoethane sulfonate), 12 parts of anhydrous sodium carbonate and 300 parts of absolute alcohol are heated at reflux temperature for 20 hours.

The solution is allowed to cool and worked up as in Example 1A. A bluish green product with about 10% chlorine is obtained.

B. *Bis-(N,N-di-(hydroxyethyl)aminomethyl)-N'-(sulfoethyl)aminomethyl copper phthalocyanine*

Thirty parts of the intermediate from A above are mixed with 120 parts of diethanolamine and heated with stirring to 80° C. The mixture is stirred at 80° C. for 12 hours. It is then cooled to room temperature and worked up as in Example 1B. A dark blue powder is obtained with a chlorine content of less than 1%.

C. *Sulfation*

Thirty-one parts of sulfur trioxide are added slowly to 480 parts of dimethyl aniline. After all the sulfur trioxide is added, 40 parts of the intermediate from B above are added to the solution. The reaction mixture is heated to 100° C. for two hours. It is then cooled and poured into 400 parts of cold water. The solution is adjusted to a pH of 6.0 with 50% sodium hydroxide solution and the dimethyl aniline removed under vacuum steam distillation. After all the solvent is removed, the product is isolated by evaporation of the aqueous solution on a steam bath. A turquoise blue powder is obtained which gives a deep blue solution when dissolved in water. It is the sodium salt of the dyestuff of the formula:

$$CuPcy\begin{cases} -CH_2NH-CH_2CH_2SO_3H \\ \left(-CH_2N\begin{cases} CH_2CH_2OSO_3H \\ CH_2CH_2OSO_3H \end{cases}\right)_2 \end{cases}$$

EXAMPLE 4

*Phosphation*

Ten parts of the intermediate from Example 3B above are added slowly to 60 parts of syrupy phosphoric acid (phospholeum, 105% $H_3PO_4$) and the solution heated at 100° C. for two hours. The reaction mixture is then poured into 600 parts of ice water, filtered, re-slurried in water, the slurry adjusted to a pH of 5–6 with 50% sodium hydroxide solution, and the desired product salted out with sodium chloride, filtered and washed with salt solution. The dried product is a blue powder readily soluble in water having the formula:

$$CuPcy\begin{cases} -CH_2NH-CH_2CH_2SO_3H \\ \left(-CH_2N\begin{cases} CH_2CH_2OPO_3H_2 \\ CH_2CH_2OPO_3H_2 \end{cases}\right)_2 \end{cases}$$

EXAMPLE 5

*Oxysulfonylation*

Forty parts of the intermediate from Example 2B above are added gradually to a solution of 80 parts of benzene sulfonyl dichloride in 200 parts of pyridine, allowing the temperature to rise to 40° C. The temperature is held at 40° C. for about an hour, then the reaction mixture is cooled and poured into 600 parts of cold water. The solution is adjusted to a pH of about 6.0 with 50% potassium hydroxide solution and the pyridine and water mixture distilled off on the vacuum at temperatures below 60° C. After all the pyridine is removed, the aqueous solution is evaporated on a steam bath and dried on the vacuum. The product is a blue powder having the formula:

$$CuPcy\begin{cases} CH_2N\begin{cases} CH_3 \\ CH_2CH_2SO_3H \end{cases} \\ CH_2N\begin{cases} CH_2CH_2OSO_2-\langle\bigcirc\rangle-SO_3H \\ CH_2CH_2OSO_2-\langle\bigcirc\rangle-SO_3H \end{cases} \end{cases}$$

EXAMPLE 6

A cotton fabric is printed with a paste consisting of 20 parts of one of the dyestuffs produced in the above examples, 100 parts of urea, 350 parts of water, 500 parts of sodium alginate thickener and 20 parts of sodium bicarbonate, dried and steamed for 10 minutes at 103° C. The fabric is then soaped well and rinsed. Brilliant turquoise blue prints are obtained with good wet fastness, crocking and lightfastness.

This invention has been disclosed with respect to certain preferred embodiments and various modifications and variations thereof will become obvious to the person skilled in the art. It is to be understood that such modifications and variations are to be included within the spirit and scope of this invention.

I claim:

1. A compound of the formula $$Pcy\begin{cases} (-CH_2NR-CH_2CH_2SO_3H)_m \\ (-CH_2NR^1-CH_2CH_2-X)_n \end{cases}$$

wherein (1) Pcy represents a member of the group consisting of metal and metal-free phthalocyanine
(2) R is a member of the group consisting of H, lower alkyl, hydroxy-ethyl and —$CH_2CH_2SO_3H$,
(3) $R^1$ is a member of the group consisting of H, lower alkyl, hydroxy-ethyl, and —$CH_2CH_2$—X,
(4) X is the anion of a strong acid having a dissociation constant greater than $2.0 \times 10^{-5}$ and being selected from the group consisting of sulfuric, hydrochloric, hydrobromic, hydrofluoric, iodic, phosphoric, phosphonic, phosphinic, organic sulfonic, trichloroacetic, dichloroacetic, chloracetic, and formic acids,
(5) *m* has an average value of 1 to 3, and
(6) *n* has an average value of 1 to 4.

2. A compound as defined in claim 1 wherein Pcy represents copper phthalocyanine, R represents lower alkyl, $R^1$ represents —$CH_2CH_2$—X, and X represents —$OSO_3H$.

3. A compound as defined in claim 1 wherein Pcy represents copper phthalocyanine, R represents H, $R^1$ represents —$CH_2CH_2X$, and X represents —$OSO_3H$.

4. A compound as defined in claim 1 wherein Pcy represents copper phthalocyanine, R represents H, $R^1$ represents —$CH_2CH_2$—X, and X represents —$OPO_3H_2$.

5. A compound as defined in claim 1 wherein Pcy represents copper phthalocyanine, R represents lower alkyl, $R^1$ represents —$CH_2CH_2$—X, and X represents $$-OSO_2-\langle\bigcirc\rangle-SO_3H$$

6. A compound of the formula

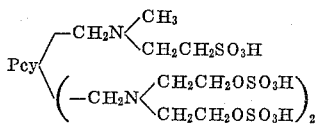

wherein Pcy represents copper phthalocyanine.

7. A compound of the formula

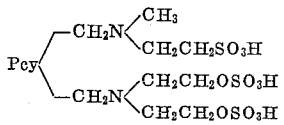

wherein Pcy represents copper phthalocyanine.

8. A compound of the formula

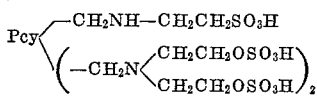

wherein Pcy represents copper phthalocyanine.

References Cited in the file of this patent
UNITED STATES PATENTS

| | | |
|---|---|---|
| 2,475,228 | Felix et al. | July 5, 1949 |
| 2,670,265 | Heyna et al. | Feb. 23, 1954 |
| 2,863,875 | Bienert et al. | Dec. 9, 1958 |
| 2,995,412 | Kleb | Aug. 8, 1961 |
| 3,023,218 | Tartter | Feb. 27, 1962 |
| 3,042,683 | Howard et al. | July 3, 1962 |
| 3,053,849 | Clark et al. | Sept. 11, 1962 |
| 3,062,830 | Buc et al. | Nov. 6, 1962 |
| 3,066,005 | Wedemeyer et al. | Nov. 27, 1962 |

FOREIGN PATENTS

| | | |
|---|---|---|
| 181,750 | Great Britain | June 19, 1922 |

OTHER REFERENCES

Wegmann: Textil-Praxis (October 1958), pages 1056–1061.

Venkataraman: Synthetic Dyes, Academic Press, N.Y. (1952), vol. II, page 814.TP913.V4.